United States Patent
Lin et al.

(10) Patent No.: US 9,693,071 B1
(45) Date of Patent: Jun. 27, 2017

(54) SELF-ADAPTIVE LOAD BALANCE OPTIMIZATION FOR MULTICORE PARALLEL PROCESSING OF VIDEO DATA

(71) Applicant: VisualOn, Inc., San Jose, CA (US)

(72) Inventors: Chin-Yee Lin, Los Gatos, CA (US); Yi Qian, Shanghai (CN); Hanyue Yang, Shanghai (CN); Hui Yang, Shanghai (CN)

(73) Assignee: VisualOn, Inc., San Jose, CA (US)

( * ) Notice: Subject to any disclaimer, the term of this patent is extended or adjusted under 35 U.S.C. 154(b) by 272 days.

(21) Appl. No.: 14/494,471

(22) Filed: Sep. 23, 2014

Related U.S. Application Data

(60) Provisional application No. 61/882,476, filed on Sep. 25, 2013.

(51) Int. Cl.
*H04N 11/02* (2006.01)
*H04L 27/06* (2006.01)
*H04N 19/436* (2014.01)
*H04N 19/127* (2014.01)

(52) U.S. Cl.
CPC ......... *H04N 19/436* (2014.11); *H04N 19/127* (2014.11)

(58) Field of Classification Search
CPC .... G10L 21/038; H03M 7/30; H04L 29/0604; H04L 29/0651; H04L 29/08783; H04L 29/08792
See application file for complete search history.

(56) References Cited

U.S. PATENT DOCUMENTS

| | | | |
|---|---|---|---|
| 2009/0064158 A1* | 3/2009 | Carter | G06F 11/3419 718/104 |
| 2009/0154572 A1* | 6/2009 | Baik | G06F 9/5088 375/240.25 |
| 2009/0324108 A1* | 12/2009 | Yan | H04N 19/61 382/232 |
| 2013/0058412 A1* | 3/2013 | Chen | H04N 19/436 375/240.13 |
| 2013/0064290 A1* | 3/2013 | Kung | H04N 7/00 375/240.03 |

\* cited by examiner

*Primary Examiner* — Md Haque
(74) *Attorney, Agent, or Firm* — Van Pelt, Yi & James LLP

(57) ABSTRACT

A system for video decoding includes an interface, a set of cores, an allocator, and a load metric measurer. The interface is to receive a set of encoded video frames. The set of cores is to process data. The allocator is to determine an assignment of the set of video decoding modules to the set of cores. The load metric measurer to measure load metrics for each module of the set of modules during decoding of the set of encoded video frames. The allocator is to determine a reassignment of the set of modules to the set of cores based at least in part on the load metrics.

18 Claims, 10 Drawing Sheets

SELF-ADAPTIVE LOAD BALANCE OPTIMIZATION FOR MULTICORE PARALLEL PROCESSING OF VIDEO DATA

CROSS REFERENCE TO OTHER APPLICATIONS

This application claims priority to U.S. Provisional Patent Application No. 61/882,476 entitled SELF-ADAPTIVE LOAD BALANCE OPTIMIZATION FOR MULTICORE PARALLEL PROCESSING filed Sep. 25, 2013 which is incorporated herein by reference for all purposes.

BACKGROUND OF THE INVENTION

A multicore processing system comprises a plurality of processing cores capable of processing data in parallel. A processing task for execution on the multicore system is broken into subtasks that can be completed independently. For example, decoding of video data is broken into a series of modules. A video data stream is fed serially into the modules that process the video data stream in pipeline fashion. However, in the event that modules load the cores unevenly, a more loaded core can bottleneck the processing pipeline.

BRIEF DESCRIPTION OF THE DRAWINGS

Various embodiments of the invention are disclosed in the following detailed description and the accompanying drawings.

DETAILED DESCRIPTION

Figure 1:
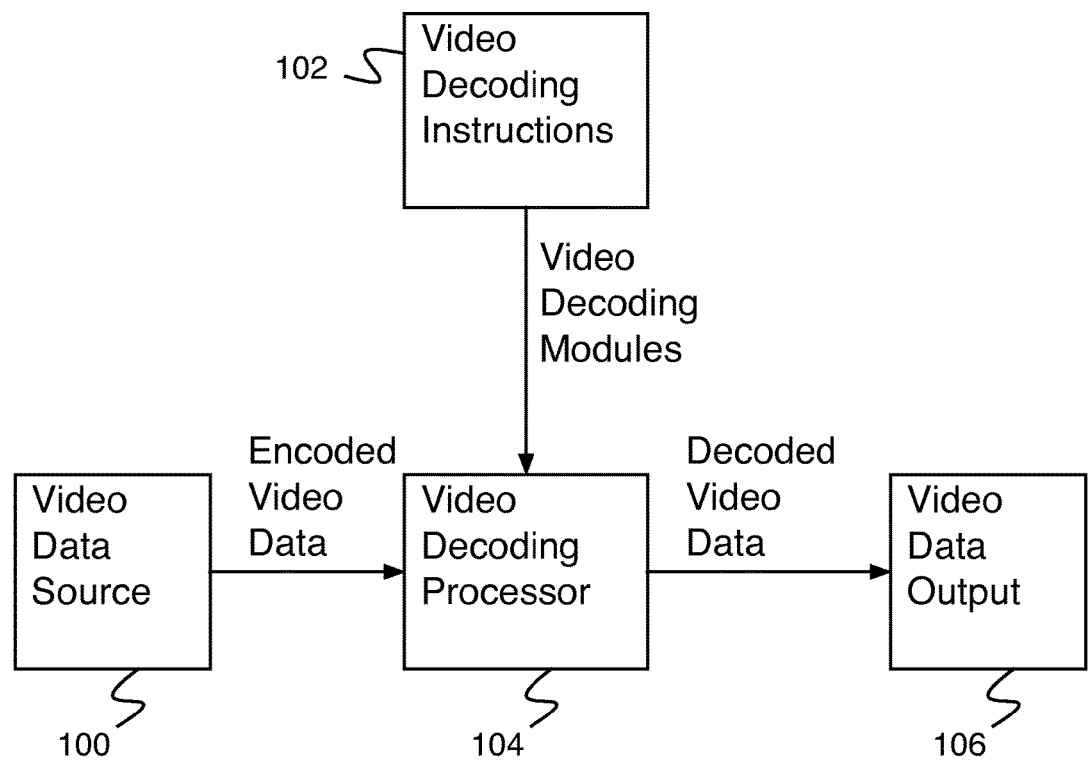
FIG. 1 is a block diagram illustrating an embodiment of a system for decoding video.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for video decoding is disclosed. The system for video decoding comprises an interface to receive a set of encoded video frames and receive a set of video decoding modules, and a set of cores to process data. The system for video decoding additionally comprises an allocator to determine an assignment of the set of video decoding modules to the set of cores, and a load metric measurer to measure load metrics for each module of the set of modules during decoding of the set of encoded video frames. The allocator is further to determine a reassignment of the set of modules to the set of cores based at least in part on the load metrics.

When a multicore system is used to process data in parallel, the load of each core depends on the hardware capability, the processing function complexity, and the characteristics of the data being processed. Optimizing the load balance between multiple cores is very challenging, particularly when the processing function complexity depends on the characteristics of the data and the other tasks being processed simultaneously. An unbalanced load between multiple cores can reduce performance significantly especially when one core can bottleneck a process.

A system to balance core loading to improve system performance is disclosed. A data processing task is divided into multiple (e.g., a number m) ordered processing modules, called M1 to Mm. A multicore system with multiple independent cores (e.g., a number y), called Core_1 to Core_y, is used to execute M1 to Mm in parallel on multiple data blocks (e.g., a number z), called D1 to Dz. Multiple consecutive processing modules can be allocated to the same core.

An example of a data processing task is High Efficiency Video Coding (HEVC or H.265) video decoding. HEVC video decoding comprises multiple ordered processing modules—for example, data parsing, de-quantization, Inverse Discrete Cosine Transform (IDCT), inter/intra prediction, de-blocking filter, and sample adaptive offset (SAO) filter. Encoded video data blocks (e.g., multiple Large Coding Units (LCUs), Macroblocks, etc.) are processed using the multiple ordered processing modules one by one. In some embodiments, examples of data processing tasks are video and image encoding or image processing and filtering.

In some embodiments, since the processing modules, M1 to Mm, have to be executed in order, there are inter-core dependencies during execution. For instance, for a module allocation where M1 is executed in Core_1 and M2 in Core_2, for the same data block Core_2 has to wait until Core_1 finishes M1 execution before executing M2. In the event the complexity of M1 is much higher than M2, it will result in a much higher processing load and processing time in Core_1 as compared to in Core_2. So Core_2 will be idle most of the time while waiting for M1 to be ready in Core_1. As a result, only a small portion of Core_2's processing power is used and the system's overall performance is not optimal. The root cause of this problem of not fully utilizing the systems processors is that the loads for Core_1 and Core_2 are not balanced and the waiting time of inter core dependency is too long.

In some embodiments, one challenge in designing an efficient multicore data processing system is in how to partition the processing steps to be executed on multiple cores so that the load is balanced and the total waiting time of inter core dependency is minimized. In addition, in the event that the loading on the multiple cores varies based on the data being decoded (e.g., different modules requiring different processing times depending on the type of data being processed) and/or other tasks being assigned to cores during the processing of the data, the load balancing will need to be dynamic in nature.

In some embodiments, the complexity of each processing step is estimated beforehand. However, each processing step often has multiple major executing branches with different complexities. The executed branch selection depends on the characteristics of each data block. The characteristics therefore change data block by data block, and can be identified only at run time. For instance, the inter/intra prediction step of the HEVC video decoding step executes in inter or intra mode based on the LCU data, identified during run time. The inter prediction has much higher complexity than intra prediction. It is difficult to estimate the core load accurately beforehand.

In some embodiments, another challenge for load balance design is that typically there are other tasks to be processed at the same time in the system, which will increase the load in whichever multiple cores those other tasks are assigned to. For instance, a video decoder is integrated in a media player—So, when running the media player on a multicore system, the system—is also handling audio decoding, stream format parsing, and audio and video rendering.

In some embodiments, a thread is executed for all processing steps in the same core. Operating systems provide the option to lock the thread execution to a particular core or the option to let the operating system dynamically decide the core. Usually the latter option provides the best system performance when all tasks in the system are running together. Since in the latter option the assignment is handled dynamically, there is further uncertainty in trying to design the load balance for multiple processors.

In some embodiments, a dynamic and self-adaptive load balancing is disclosed to overcome the challenges and improve the performance of multicore data processing. At the beginning of the process, an initial load estimation for each processing step is used, where the initial load estimation can be based on different factors—for example, statistics of processing runs, average complexity calculations, core processing speeds, core instruction and data cache sizes, input/output memory speed, and previous experience of designers. Based on the initial load estimation, an initial partitioning of all processing steps on the different cores is set to achieve an estimate of the best load balancing. During run time, the partition of the processing steps on all different cores is adjusted dynamically and automatically based on a load balance metric for the best load balancing between different cores to optimize the performance of data processing. For instance, in video decoding, the load of each step (e.g., processing in a module) will depend on the intra or inter types of data block and can change significantly. In intra blocks, the input data bandwidth, the parsing load and IDCT calculation are higher than inter blocks. But the load of inter prediction block usually is much higher than intra prediction block. The adjustments are done by moving the processing steps at the boundary of a core to another core running consecutive processing steps. In various embodiments, the partition adjustment happens at the end of each processing step, at the end of all processing steps in a core, at the end of all processing steps of all cores for one or multiple data blocks, or in any other appropriate location.

In various embodiments, the load balancing metric comprises one or more of the following: a type of data block, the run time of each core, core CPU load, waiting time, current or average performance data, or items in initial load estimation. In some embodiments, the load balancing metric is updated in real time to provide the best information for partition adjustment.

In some embodiments, the granularity of data blocks is selected differently at the beginning and changed dynamically based a performance metric as well. For instance, in various embodiments, LCU is used, multiple LCUs are used, a row of LCUs is used, or a video frame is used. In various embodiments, the performance metric includes, but is not limited to, a current or an average gain of data processing speed and the resource overhead or processing delay due to the granularity changes. In various embodiments, the change of granularity happens at the end of each processing step, at the end of all processing steps in a core, at the end of all processing steps of all cores for one data block, or at any other appropriate time. In various embodiments, the block size change happens at the end of each processing step, at the end of all processing steps in a core, at the end of all processing steps of all cores for one or multiple data blocks, or at any other appropriate time. In some embodiments, each core has its own data block size. When instruction partition or data block size are changed, the missing steps for changed data blocks are tracked and accounted for during the process and the missing steps are later performed when processing any changed blocks.

FIG. 1 is a block diagram illustrating an embodiment of a system for decoding video. In various embodiments, the system for decoding video of FIG. 1 comprises part of a video playing device, a smartphone, a tablet computer, a personal computer, a video phone, or any other appropriate video playing device. In the example shown, video data source 100 provides encoded video data to video decoding processor 104. In some embodiments, encoded video data comprises a set of encoded video blocks. In various embodiments, encoded video blocks comprise Large Coding Units (LCUs), Macroblocks, video frames, or any other appropriate encoded video block. Video decoding instructions 102 provides video decoding modules to video decoding processor 104. In some embodiments, video decoding modules comprise a set of processing modules for decoding encoded video data. In various embodiments, video decoding modules comprise 4, 6, 8, 12, 13, 17, or any other appropriate number of modules. In some embodiments, video decoding modules are executed sequentially on each block of the set of encoded video blocks (e.g., each block of the set of encoded video blocks is processed by the first module, then the second module, then the third module, etc.). In various embodiments, the units processed comprise one block, one row of blocks, or any other appropriate size for a unit. Video decoding processor provides decoded video data to video data output 106. In some embodiments, the decoded video data comprises the encoded video data processed by the video decoding modules (e.g., each block of the set of encoded video blocks processed sequentially by each of the video decoding modules). In various embodiments, video data output 106 comprises a video display, a video data memory, a wired connection to a video display, a network connection to a video display, or any other appropriate video display.

Figure 2:
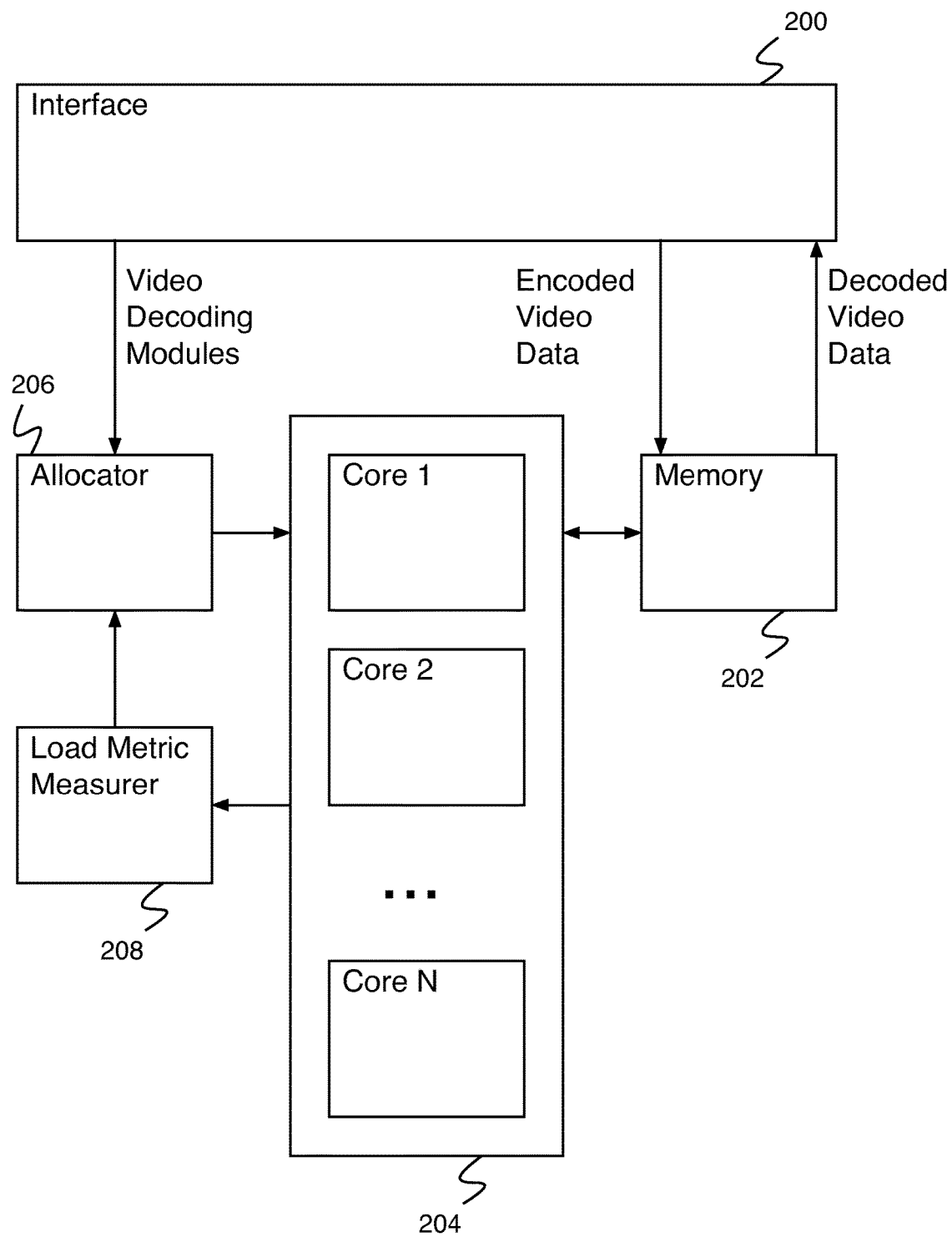
FIG. 2 is a block diagram illustrating an embodiment of a video decoding processor.

FIG. 2 is a block diagram illustrating an embodiment of a video decoding processor. In some embodiments, the system of FIG. 2 comprises video decoding processor 104. In the example shown, interface 200 comprises an interface for communicating with other computing modules. In some embodiments, interface 200 comprises an interface for receiving video decoding modules, receiving encoded video data, and providing decoded video data. Encoded video data is provided to memory 202 and stored for processing. Encoded video data is processed by processing cores 204 (e.g., core 1, core N, etc.) using video decoding modules. In some embodiments, each core of processing cores 204 comprises a processor. In some embodiments, encoded video data is processed sequentially by the video decoding modules (e.g., processed by the first video decoding module, then processed by the second video decoding module, then processed by the third video decoding module, etc.). In some embodiments, modules are assigned to processing cores according to an allocation determined by allocator 206. In some embodiments, processed video data is stored in memory 202 after processing by each video decoding module (e.g., a set of video data is stored after processing by the first module, a set of video data is stored after processing by the second module, etc.). In some embodiments, each video decoding module retrieves data from memory 202, processes the data, and stores the processed data back in memory 202 (e.g., for retrieval by the next processing module, possibly being executed on a different processing core). In some embodiments, multiple consecutive modules are executed on a single core (e.g., modules 2 and 3 are both executed on core 2), and the intermediate data (e.g., data processed by module 2 but not by module 3) is not provided to memory 202. Allocator 206 comprises a video decoding module allocator for assigning a set of video decoding modules to a set of cores. In some embodiments, allocator 206 is implemented using a processor. In some embodiments, each core is allocated any appropriate number of sequential modules (e.g., a core can process more than one module, but they must be sequential, e.g., modules 4, 5, and 6). In some embodiments, allocator 206 can reallocate modules to cores (e.g., make a revised allocation) based on information received from load metric measurer 208. Load metric measurer 208 comprises a load metric measurer for measuring one or more load metrics of processing cores 204. In some embodiments, load metric measurer 208 provides load metrics of processing cores 204 to allocator 206. In some embodiments, load metric measurer 208 is implemented using a processor. In various embodiments, an allocation is based at least in part on one or more of: a type of data block being processed, a run time of each core (e.g., how long it takes to complete all module processing of each core), a run time of each module, a core CPU loading, a core idle time, a current performance data, an average performance data, or any other appropriate information. In various embodiments, allocator 206 receives information from load metric measurer 208 describing the run time of each core, the run time of each module, core CPU loading, core idle time, current performance data, average performance data, or any other appropriate information.

Figure 3:
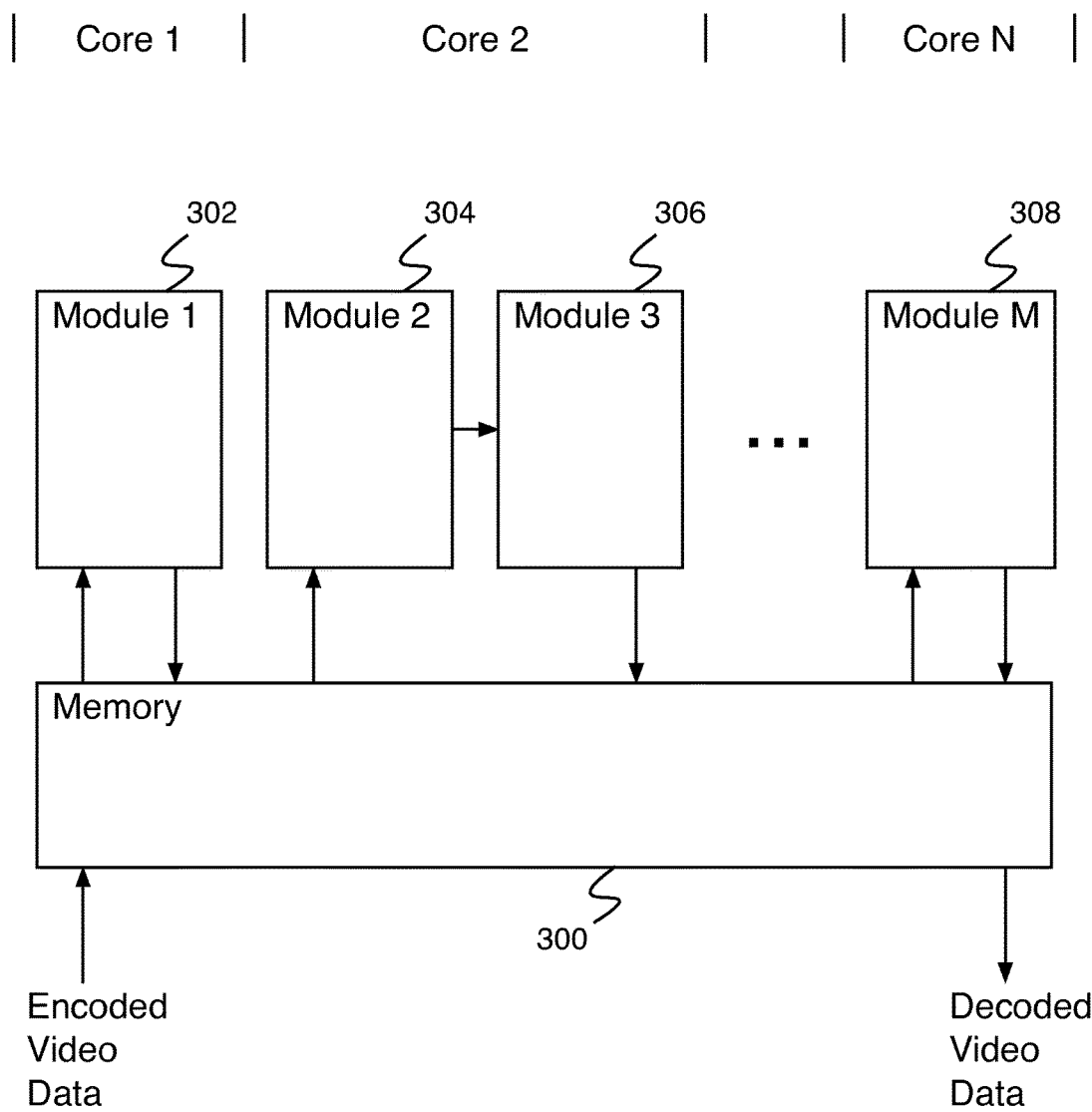
FIG. 3 is a block diagram illustrating data flow through a set of video processing modules.

FIG. 3 is a block diagram illustrating data flow through a set of video processing modules. In some embodiments, video processing modules are executed by and implemented on processing cores (e.g., processing cores 204 of FIG. 2). In the example shown, encoded video data is received and stored in memory 300. Module 1 302 is allocated to core 1. The encoded video data is processed by module 1 302 (e.g., on core 1) and the module 1 processed video data is stored in memory 300. In the example shown, module 2 304 and module 3 306 are both allocated to core 2. Module 2 304 receives and processes module 1 processed video data. Module 2 304 provides module 2 processed video data directly to module 3 306. In some embodiments, module 2 304 output video data is stored in memory 300 and not passed directly to module 3 306. Module 3 306 receives and processes module 2 processed video data and produces module 3 processed video data, which is then stored in memory 300. The remainder of the modules are executed in the same way, storing their output in memory 300 in the event the next module is allocated to a different core, or passing its output directly to the next module when it is allocated to the same core. In the example shown, the final module, module M 308 is the only module allocated to core N. Module M 308 receives module M−1 processed video data from memory 300, processes the data, and produces decoded video data, which is stored in memory 300 and output.

Figure 4:
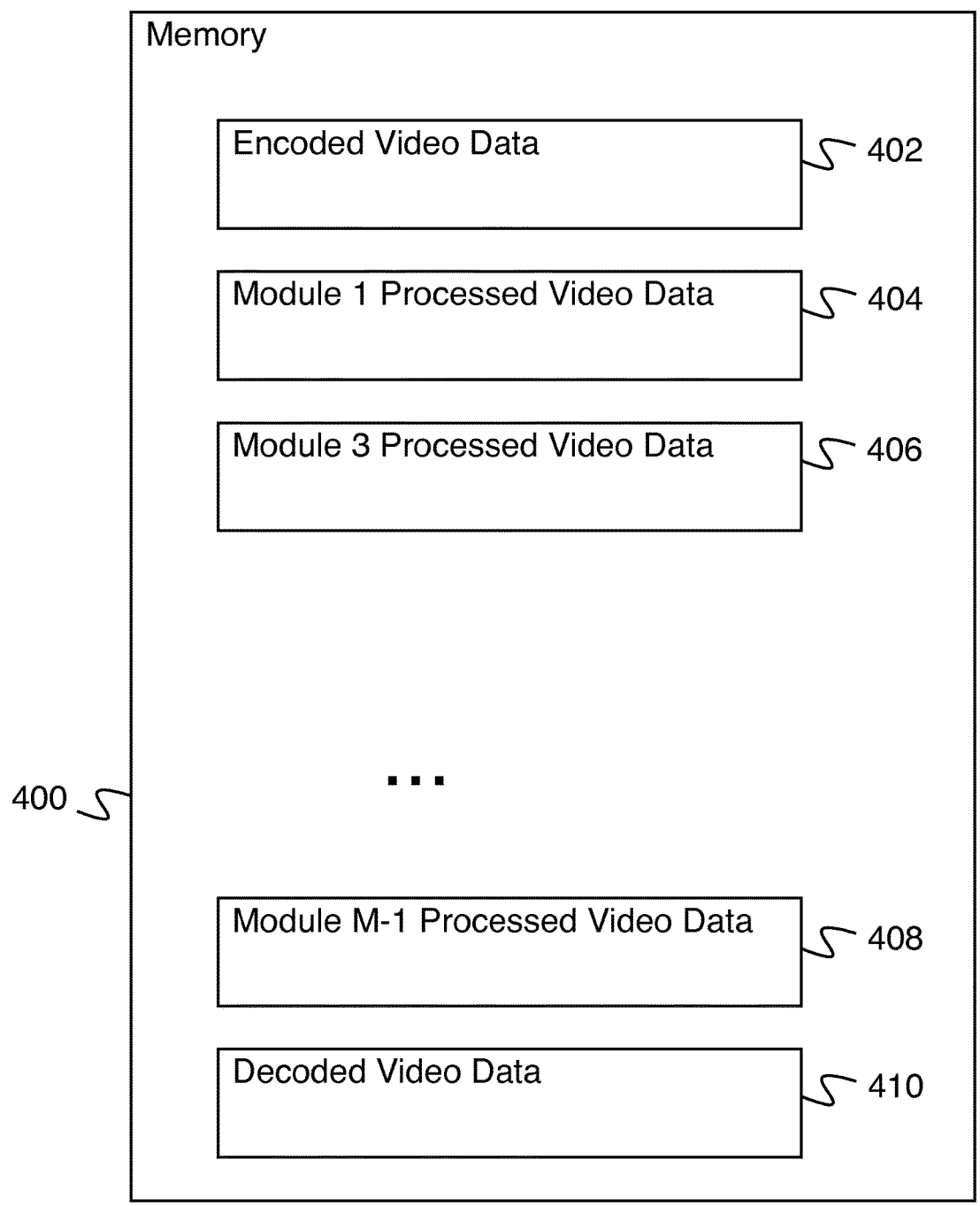
FIG. 4 is a block diagram illustrating an embodiment of a memory.

FIG. 4 is a block diagram illustrating an embodiment of a memory. In some embodiments, memory 400 comprises memory 300 of FIG. 3. In the example shown, memory 400 stores encoded video data, decoded video data, and video data at various intermediate stages of processing (e.g., module 1 processed video data 404, module 3 processed video data 406, and module M−1 processed video data 408). In some embodiments, data output from the last module allocated to each core is stored in memory 400. In some embodiments, each module processes data sequentially by block (e.g., module 1 processes block 1, then block 2, then block 3, etc.), wherein a block comprises a Large Coding Unit (LCU), a Macroblock, a video frame, etc. As the module processes each block of the video data, the processed blocks are added to the stored processed video data. The decoded video data stored in 410 is provided so that it is able to be displayed.

Figure 5:
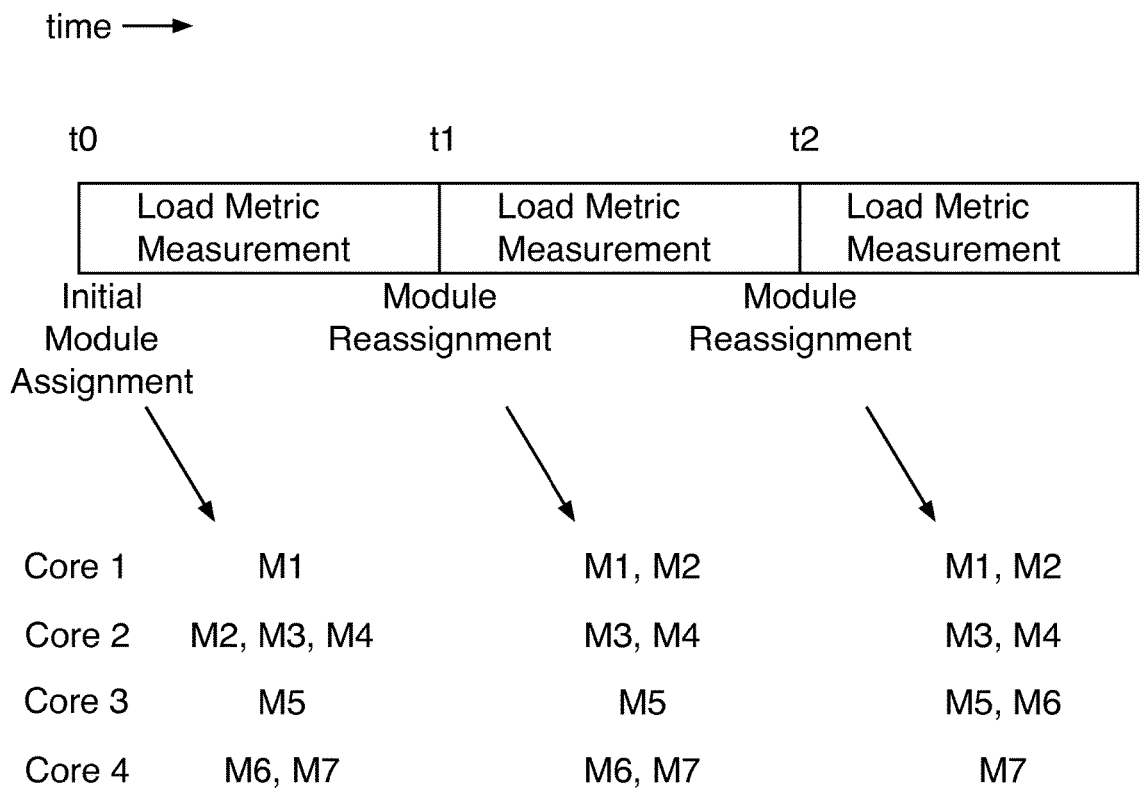
FIG. 5 is a block diagram illustrating an embodiment of module assignment and reassignment.

FIG. 5 is a block diagram illustrating an embodiment of module assignment and reassignment. In some embodiments, the block diagram of FIG. 5 illustrates assignment and reassignment of modules (e.g., modules as shown in FIG. 3) to cores (e.g., cores of cores 204 of FIG. 2). In the example shown, at time t0, an initial module assignment is performed. In some embodiments, module assignment and reassignment is performed by an allocator (e.g., allocator 206 of FIG. 2). In some embodiments, an initial module assignment comprises an initial assignment of software video decoding modules to hardware cores. In various embodiments, an initial module assignment is based at least in part on an expected module loading, a typical set of encoded video frames, a core loading, or any other appropriate information. In some embodiments, an initial module assignment is performed by an allocator. In the example shown, module M1 is allocated to core 1, modules M2, M3, and M4 are assigned to core 2, module M5 is assigned to core 3, and modules M6 and M7 are assigned to core 4. In some embodiments, any appropriate number of modules are assigned to each core. In some embodiments, multiple modules are assigned to a core only in the event the multiple modules are sequential (e.g., modules M2, M3, and M4). During the period from t0 to t1, load metric measurement is performed. At time t1, module reassignment is performed. In some embodiments, module reassignment comprises a revision of a module assignment in order to improve a module loading balance. In some embodiments, a module reassignment is based at least in part on a load metric measurement. In various embodiments, a load metric measurement comprises a run time of a core, a run time of a module, core CPU loading, core idle time, current performance data, average performance data, or any other appropriate load metric measurement. In some embodiments, a module reassignment is performed by an allocator. In the example shown, after reassignment at time t1, modules M1 and M2 are assigned to core 1, modules M3 and M4 are assigned to core 2, module M5 is assigned to core 3, and modules M6 and M7 are assigned to core 4. During the period from t1 to t2, load metric measurement is performed. At time t2, module reassignment is performed. In the example shown, after reassignment at time t2, modules M1 and M2 are assigned to core 1, modules M3 and M4 are assigned to core 2, modules M5 and M6 are assigned to core 3, and module M7 is assigned to core 4. In various embodiments, module reassignment is performed in order to refine module loading balance, in order to account for changing data patterns, in order to account for changing core loading from other processes, or for any other appropriate reason. In some embodiments, module reassignment is performed repeatedly until data decoding is complete. In various embodiments, module reassignment happens at the end of each processing step, at the end of all processing steps in a core, at the end of all processing steps of all cores for one or multiple data blocks, after a predetermined number of processing cycles, after a predetermined amount of time, or at any other appropriate time. In some embodiments, the time period from initial module allocation until module reassignment (e.g., time t0 until time t1) is different (e.g., shorter, longer) than a typical time period from a first module reassignment to a second module reassignment (e.g., time t1 until time t2). In some embodiments, the time until the next module reassignment is determined as part of the module reassignment. In some embodiments, the time until the next module reassignment is performed by an allocator.

Figure 6:
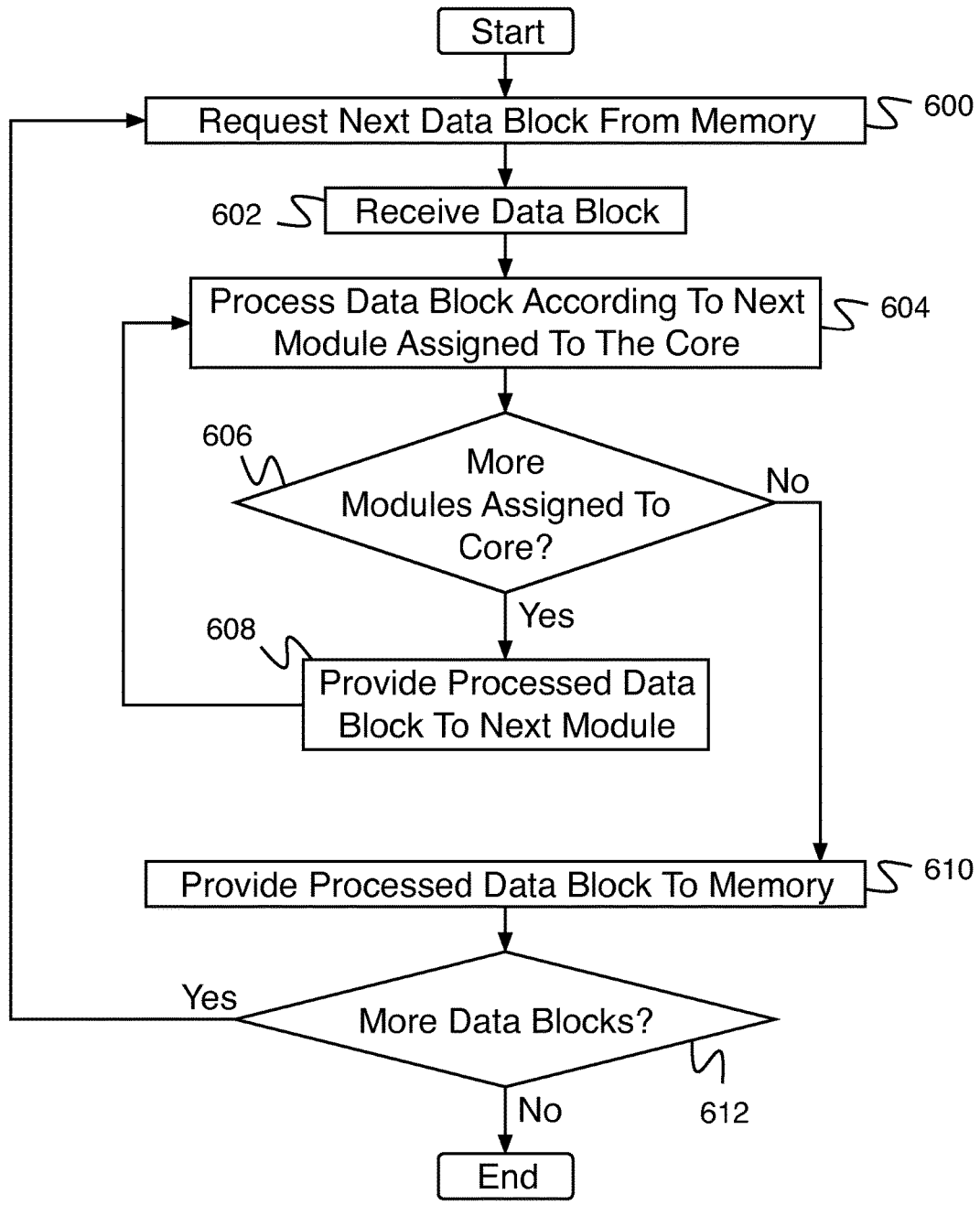
FIG. 6 is a flow diagram illustrating an embodiment of a process for processing data.

FIG. 6 is a flow diagram illustrating an embodiment of a process for processing data. In some embodiments, the process of FIG. 6 is used by a core (e.g., one of cores 204 of FIG. 2) for implementing the processing of one or more processing modules. In the example shown, in 600, the next data block is requested from memory. In some embodiments, the next data block comprises the first data block. In various embodiments, the data block comprises a Large Coding Unit (LCU), a Macroblock, a video frame, or any other appropriate data block type. In 602, the data block is received. In 604, the data block is processed according to the next module assigned to the core. In some embodiments, the next module assigned to the core comprises the first module assigned to the core. In 606, it is determined whether more modules are assigned to the core. In the event it is determined that there are not more modules assigned to the core, control passes to 610. In the event it is determined that there are more modules assigned to the core, control passes to 608. In 608, the processed data block is provided to the next module. Control then passes to 604. In 610, the processed data block is provided to memory (e.g., for storage). In 612, it is determined whether there are more data blocks (e.g., whether decoding of the encoded data is not yet complete). In the event it is determined that there are more data blocks, control passes to 600. In the event it is determined that there are not more data blocks, the process ends.

In some embodiments, processed data is provided to memory regardless of whether an additional module is processed by core, and in that event 606 and 608 are bypassed in the process of FIG. 6.

Figure 7:
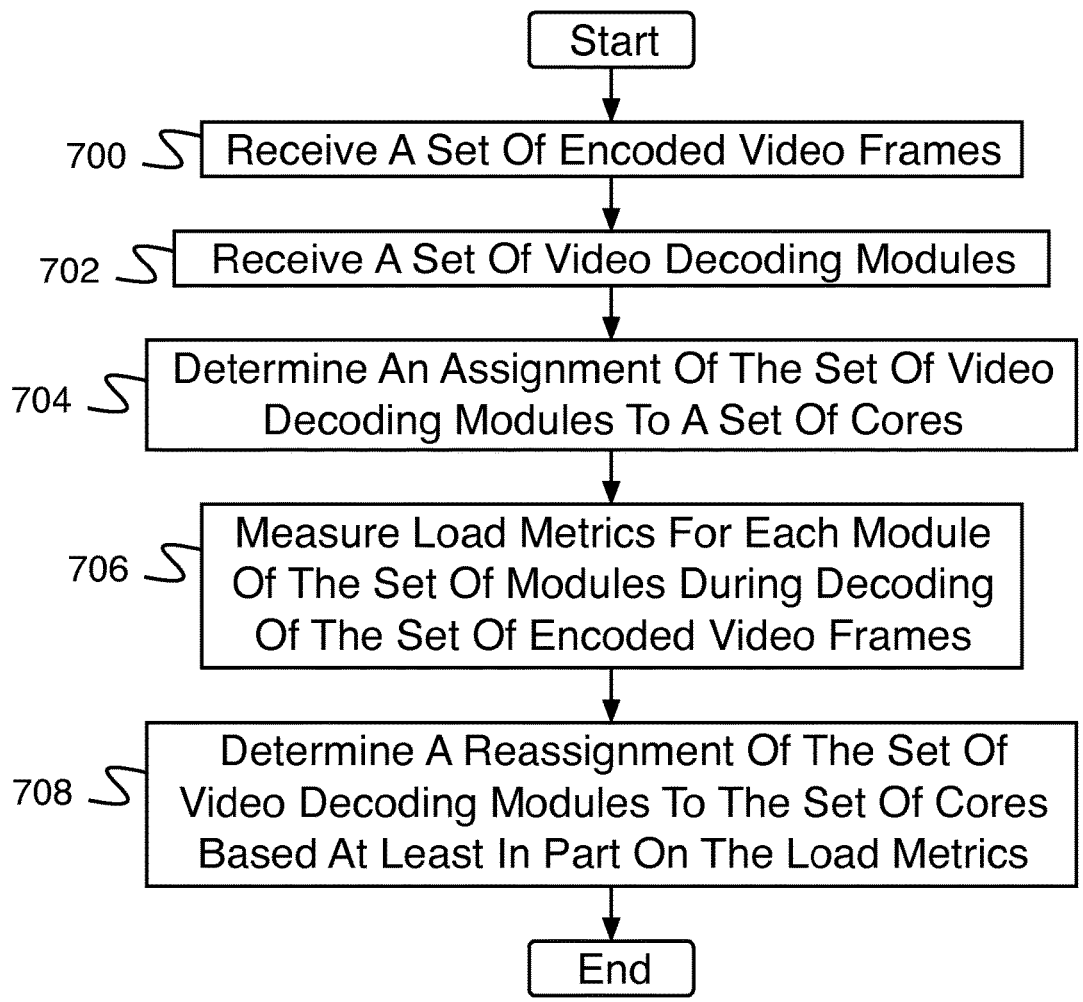
FIG. 7 is a flow diagram illustrating an embodiment of a process for decoding.

FIG. 7 is a flow diagram illustrating an embodiment of a process for decoding. In some embodiments, the process of FIG. 7 is implemented by the system of FIG. 2. In the example shown, in 700, a set of encoded video frames is received. In 702, a set of video decoding modules is received. In 704, an assignment of the set of video decoding modules to a set of cores (e.g., a set of cores as in cores 204 of FIG. 2) is determined. In 706, load metrics for each module of the set of modules is measured during decoding of the set of encoded video frames. In 708, a reassignment of the set of cores is determined based at least in part on the load metrics.

Figure 8:
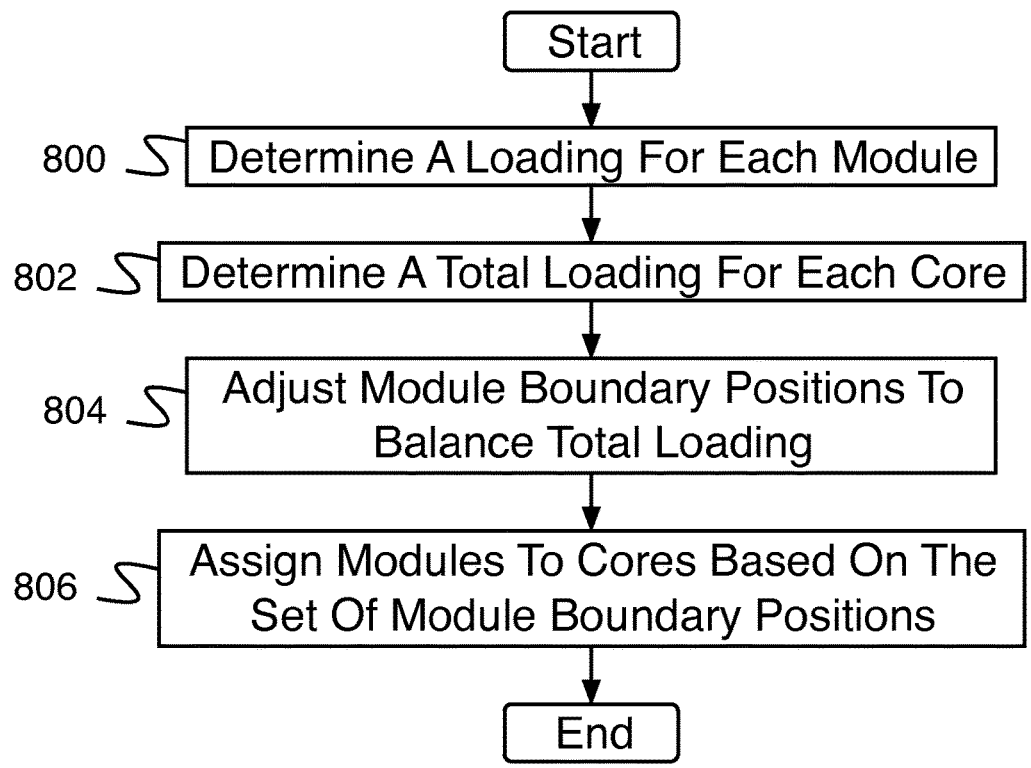
FIG. 8 is a flow diagram illustrating an embodiment of a process for assigning modules to cores.

FIG. 8 is a flow diagram illustrating an embodiment of a process for assigning modules to cores. In some embodiments, the process of FIG. 8 implements 710 of FIG. 7. In 800, a loading for each module is determined. In various embodiments, a loading comprises a fraction of core usage, a time to completion, a number of operations, or any other appropriate loading metric. In 802, a total loading for each core is determined. The total loading for a core comprises the total loading for all processes executing on the core (e.g., the sum of the load of all modules assigned to the core and any other processes executing on the core). In some embodiments, a ranking is determined for the cores based on the loading. In 804, module boundary positions are adjusted to balance total loading. In some embodiments, a module boundary position comprises a division of modules between a first core and a second core (e.g., multiple modules can be assigned to a core only if they are processed consecutively, so a description of a module assignment comprises a description of the boundary positions—for example, boundaries between cores occur after modules M2, M4, and M6.). In some embodiments, a highest core with multiple modules in it is selected and one module of assigned to the core is moved. In some embodiments, the first module in the process of the selected core is moved to the previous core or the last module in the process of the selected core is moved to the subsequent core. In some embodiments, the module selected for the move is determined by which core (the prior or subsequent core) has less loading (e.g., in the event the prior core has less loading, the first module is moved to the prior core; in the event that the subsequent core has less loading, the last module is move the subsequent core). In 806, modules are assigned to cores based on the set of module boundary positions.

Figure 9:
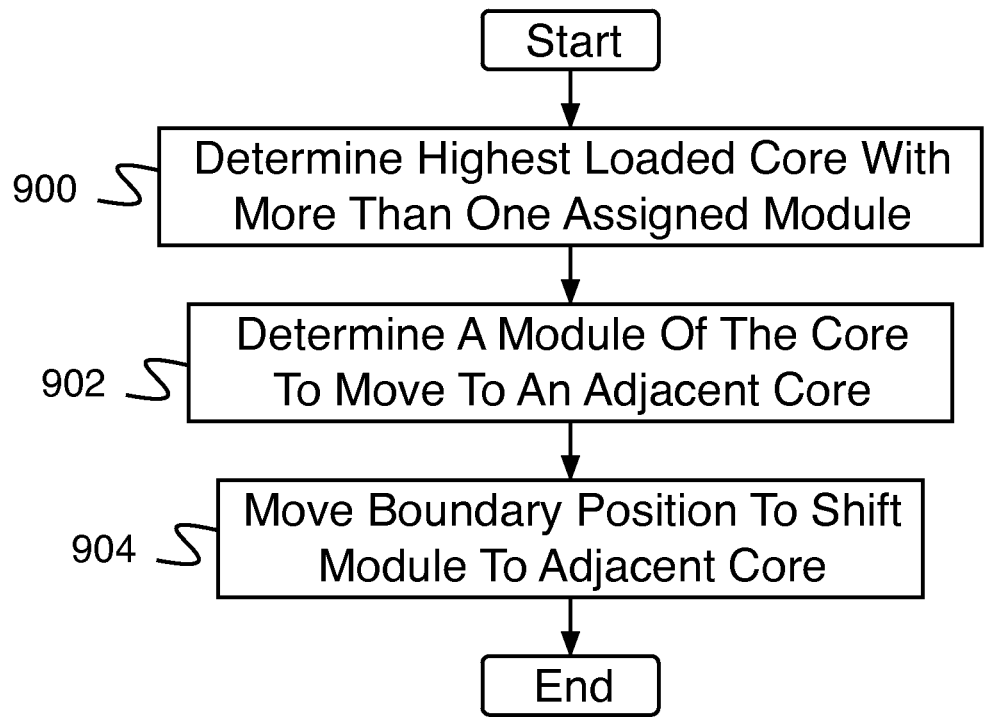
FIG. 9 is a flow diagram illustrating an embodiment of a process for adjusting module boundary positions to balance total loading.

FIG. 9 is a flow diagram illustrating an embodiment of a process for adjusting module boundary positions to balance total loading. In some embodiments, the process of FIG. 9 implements 804 of FIG. 8. In the example shown, in 900, the highest loaded core with more than one assigned module is determined. In 902, a module of the core (e.g., the core determined in 900) is determined to move to an adjacent core. In some embodiments, the module of the core to move to the adjacent core is determined by selecting the module that will move to the less loaded core (e.g., if core 2 is the highest loaded core with more than one assigned module, the first module of core 2 can be moved to core 1 or the last module of core 2 can be moved to core 3; selecting the module that will move to the less loaded core comprises selecting the module that will move to the less loaded of core 1 or core 3), by selecting the module that will result in the most balanced total loading, by selecting the module that will result in a lower highest loaded core, or in any other appropriate way. In 904, a boundary position is moved to shift the module (e.g., the module determined in 902) to the adjacent core.

For example, six data processing modules are used to implement the high efficiency video coding (HEVC) algorithm. The modules comprise a parsing module, a dequantization module, an inverse discrete cosine transform (IDCT) module, a prediction module, a deblock module, and a sample adaptive offset (SAO) filter module. The six modules are initially assigned to four cores as follows:

C1: parsing, dequantization
C2: IDCT
C3: prediction
C4: deblock, SAO

During an initial running period (e.g., 100 frames), the working time for each module is measured. After the initial running period, a reassignment is performed. The core that has the largest load and more than one module is selected, and one module is moved to an adjacent core with a smaller load. For example, if the result of measuring load is C1>C3>C2>C4, a module should be moved from C1. Only one move is possible, moving dequantization to C2, yielding the new assignment:

C1: parsing
C2: dequantization, IDCT
C3: prediction
C4: deblock, SAO

After a reassignment period (that may be different from the initial running period, e.g., 10 frames), the load is measured, and reassignment is performed again. In this example, the result C2>C1>C3>C4 is received, indicating a module should be moved out of C2. Since the load of C1 is greater than the load of C3, the IDCT module should be moved from C2 to C3, yielding:

C1: parsing
C2: dequantization
C3: IDCT, prediction
C4: deblock, SAO

Figure 10:
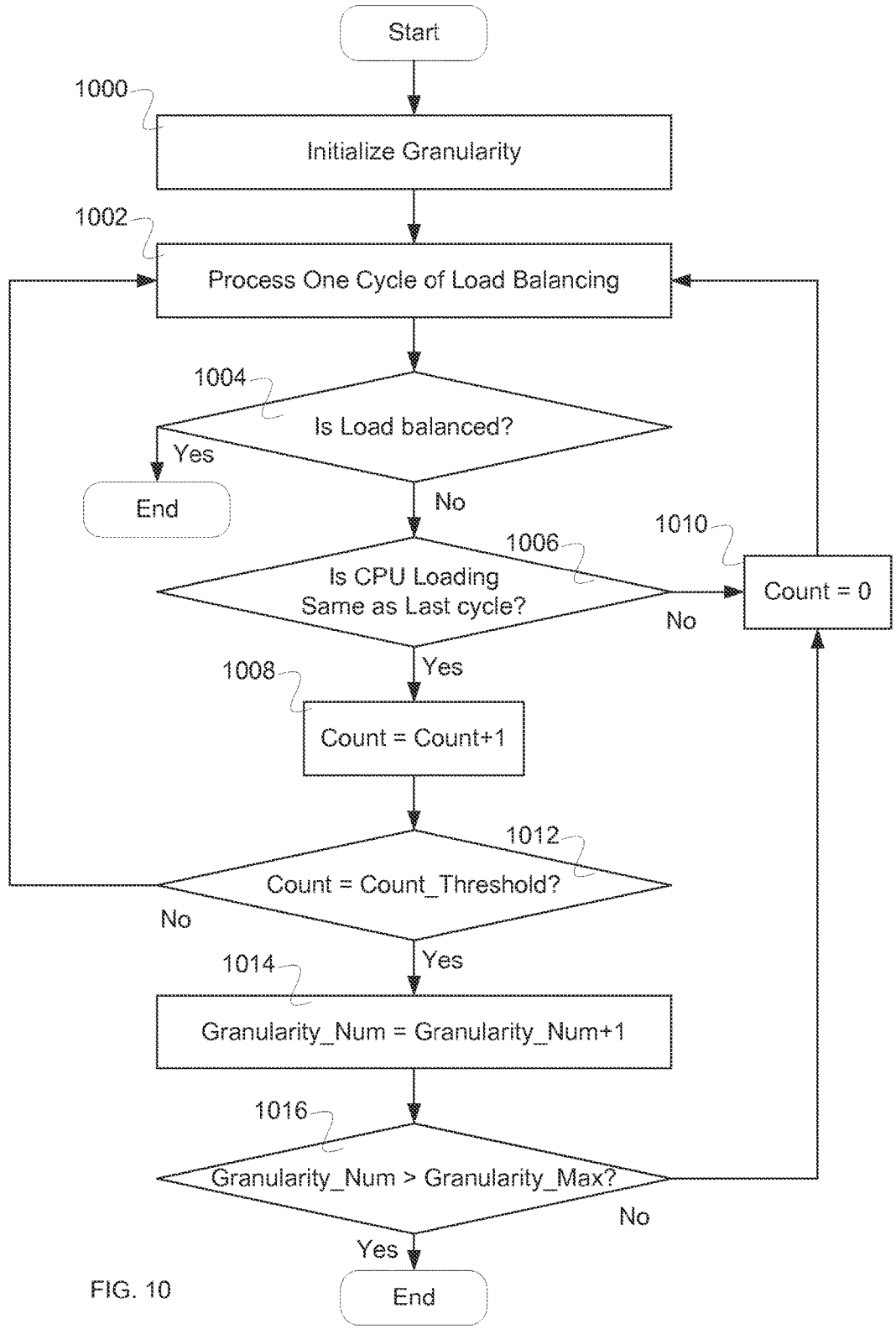
FIG. 10 is a flow diagram illustrating an embodiment of a process for adjusting granularity.

FIG. 10 is a flow diagram illustrating an embodiment of a process for adjusting granularity. In some embodiments, in the event that the loading cannot be adjusted by moving modules between cores, granularity is adjusted. The granularity is adjusted from smaller units to larger units and is not adjusted from larger units to smaller units. In the example shown, in 1000 granularity adjustment is initialized. For example, the change threshold (e.g., change_threshold) is set to 10; the maximum granularity number is set to the number of units per row (e.g., granularity_max=30 LCUs per row for a HEVC 1920×1088 picture); count is set to 0 (e.g., count=0); and granularity is set to 1 (e.g., granularity_num=1). In some embodiments, a granularity unit comprises a LCU—for example, for HEVC a LCU is typically 64×64 pixels. In some embodiments, a granularity unit comprises a macroblock—for example, for H.264 a macroblock is typically 16×16 pixels. In some embodiments, the number of units per row is based on the resolution of the picture—for example in the event that a picture is 1920×1088, the units per row 30 (e.g., 1920/64) and there are 17 rows in the picture (e.g., 1088/64). In some embodiments, the number of units per row is based on the resolution of the picture—for example for a macroblock, in the event that a picture is 1920×1088, the units per row 120 (e.g., 1920/16) and there are 68 rows in the picture (e.g., 1088/16). In some embodiments, granularity=1 means 1 LCU or 1 macroblock for a processing unit; and granularity=2 means 2 LCUs or 2 macroblocks for a processing unit depending on codec used (e.g., HEVC or H264).

In 1002, one cycle of load balancing is processed. For example, one or more frames are processed for one cycle and metrics are measured. In some embodiments, modules are assigned to cores to balance loading (e.g., using the process of FIG. 8). In various embodiments, one cycle comprises 1 frame, 5 frames, 10 frames, 100 frames, or any other appropriate number of frames. In 1004, it is determined whether the load is balanced. For example, whether the loading between the cores is balanced. In some embodiments, it is determined that the load is balanced in the event that all cores have the same loading (e.g., within a threshold). In some embodiments, it is determined that all cores have the same loading if the most loaded core is no more than 5% more loaded than the least loaded core. In some embodiments, in the event that it is determined that the load is balanced, the process ends. In the event it is determined that the load is not balanced, control passes to 1006. In 1006, it is determined whether the CPU loading is the same as the last cycle. For example, the CPU loading is the same during the cycle processed in 1002 as the previous time a cycle was processed. In some embodiments, the CPU loading being the same as the last cycle comprises the module loading the same as the last cycle (e.g., each core is executing the same modules as the last cycle, and the loading of each module is the same as the last cycle). In some embodiments, the CPU loading being the same as last cycle comprises the other loading being the same as the last cycle (e.g., loading on the cores from other computing processes is the same as the last cycle). In some embodiments, determining that CPU loading is the same as the last cycle comprises determining that load balancing (e.g., load balancing performed in 1002) is not improving the load imbalance. In the event it is determined that CPU loading is the same as the last cycle, control passes to 1008. In the event it is determined that the CPU loading is not the same as the last cycle, control passes to 1010. In 1010, a counter (e.g., the value "Count") is reset to zero. Control then passes to 1002. In 1008, count=count+1. For example, the count counter is incremented by one. In some embodiments, a number of cycles of processing load balancing without any change in the CPU loading is represented by the counter value "Count". In 1012, it is determined whether the counter value equals a threshold value (e.g., does count equal "Count_Threshold"?). In some embodiments, the counter value matching the threshold value indicates that the threshold number of cycles of load balancing have been performed, and the CPU loading has not changed. In the event it is determined that the counter value does not equal the threshold value, control passes to 1002. In the event it is determined that the counter value equals the threshold value, control passes to 1014. In 1014, Granularity_Num=Granularity_Num+1. For example, the granularity is incremented. In 1016, it is determined whether the granularity is greater than a threshold (e.g., "Granularity_Num>Granularity_Max"). In the event the granularity is not greater than the threshold, control passes to 1010. In the event the granularity is greater than the threshold, the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for video decoding, comprising:
a hardware interface configured to:
receive a set of encoded video frames;
a set of cores to process data; and a processor configured to:
determine an assignment of a set of video decoding modules to the set of cores; measure load metrics for each module of the set of modules during decoding of the set of encoded video frames; and
determine a reassignment of the set of modules to the set of cores based at least in part on the load metrics, wherein determining the reassignment comprises:
determining a subset of the set of cores, wherein the subset of the set of cores includes cores having at least two assigned modules; determining a highest loaded core of the subset of the set of cores based at least in part on the load metrics;
determining a module of the highest loaded core to move to a core adjacent to the highest loaded core based at least in part on the load metrics, wherein the module of the highest loaded core to move is determined by selecting a module that will move to a less loaded core adjacent to the highest loaded core, by selecting a module that will result in a more balanced total loading of the set of cores, or by selecting a module that will result in a lower highest loaded core of the set of cores; and
reassigning the module of the highest loaded core from the highest loaded core to the core adjacent to the highest loaded core.

2. The system of claim 1, wherein the processor is further configured to determine a time until a next reassignment of the set of modules to the set of cores.

3. The system of claim 1, wherein determining the reassignment further comprises determining a time until a next reassignment of the set of modules to the set of cores.

4. The system of claim 1, wherein the set of video decoding modules comprises the set of video decoding modules for a High Efficiency Video Coding algorithm.

5. The system of claim 1, wherein the load metrics comprise a run time of a core of the set of cores.

6. The system of claim 1, wherein the load metrics comprise a CPU loading of a core of the set of cores.

7. The system of claim 1, wherein the load metrics comprise an idle time of a core of the set of cores.

8. The system of claim 1, wherein the load metrics comprise a run time of a module of the set of modules.

9. The system of claim 1, wherein the load metrics comprise current performance data.

10. The system of claim 1, wherein the load metrics comprise average performance data.

11. The system of claim 1, wherein the load metrics comprise a type of a data block, wherein the data block comprises a portion of the set of encoded video frames.

12. The system of claim 11, wherein the assignment of the set of video decoding modules to the set of cores is based at least in part on an expected module loading due to a type of a data block to be decoded.

13. The system of claim 1, wherein the assignment of the set of video decoding modules to the set of cores is based at least in part on a typical set of encoded video frames.

14. A method for video decoding, comprising:
receiving a set of encoded video frames;
determining, using a processor, an assignment of a set of video decoding modules to a set of cores;
measuring load metrics for each module of the set of modules during decoding of the set of encoded video frames; and
determining a reassignment of the set of modules to the set of cores based at least in part on the load metrics, wherein determining the reassignment comprises:
determining a subset of the set of cores, wherein the subset of the set of cores includes cores having at least two assigned modules;
determining a highest loaded core of the subset of the set of cores based at least in part on the load metrics;
determining a module of the highest loaded core to move to a core adjacent to the highest loaded core based at least in part on the load metrics, wherein the module of the highest loaded core to move is determined by selecting a module that will move to a less loaded core adjacent to the highest loaded core, by selecting a module that will result in a more balanced total loading of the set of cores, or by selecting a module that will result in a lower highest loaded core of the set of cores; and
reassigning the module of the highest loaded core from the highest loaded core to the core adjacent to the highest loaded core.

15. A computer program product for video decoding, the computer program product being embodied in a non-transitory computer readable storage medium and comprising computer instructions for:
receiving a set of encoded video frames;
determining, using a processor, an assignment of a set of video decoding modules to a set of cores;
measuring load metrics for each module of the set of modules during decoding of the set of encoded video frames; and
determining a reassignment of the set of modules to the set of cores based at least in part on the load metrics, wherein determining the reassignment comprises:
determining a subset of the set of cores, wherein the subset of the set of cores includes cores having at least two assigned modules;
determining a highest loaded core of the subset of the set of cores based at least in part on the load metrics;
determining a module of the highest loaded core to move to a core adjacent to the highest loaded core based at least in part on the load metrics, wherein the module of the highest loaded core to move is determined by selecting a module that will move to a less loaded core adjacent to the highest loaded core, by selecting a module that will result in a more balanced total loading of the set of cores, or by selecting a module that will result in a lower highest loaded core of the set of cores; and
reassigning the module of the highest loaded core from the highest loaded core to the core adjacent to the highest loaded core.

16. The system of claim 1, wherein the at least two assigned modules are sequential.

17. The system of claim 1, wherein the highest loaded core and the core adjacent to the highest loaded core run consecutive process steps.

18. The system of claim 17, wherein the core adjacent to the highest loaded core is a previous core in the consecutive process steps or a subsequent core in the consecutive process steps.

* * * * *